Sept. 14, 1926.
J. P. DENNEBAUM
GUARD DEVICE
Filed April 22, 1925   2 Sheets-Sheet 1
1,600,165
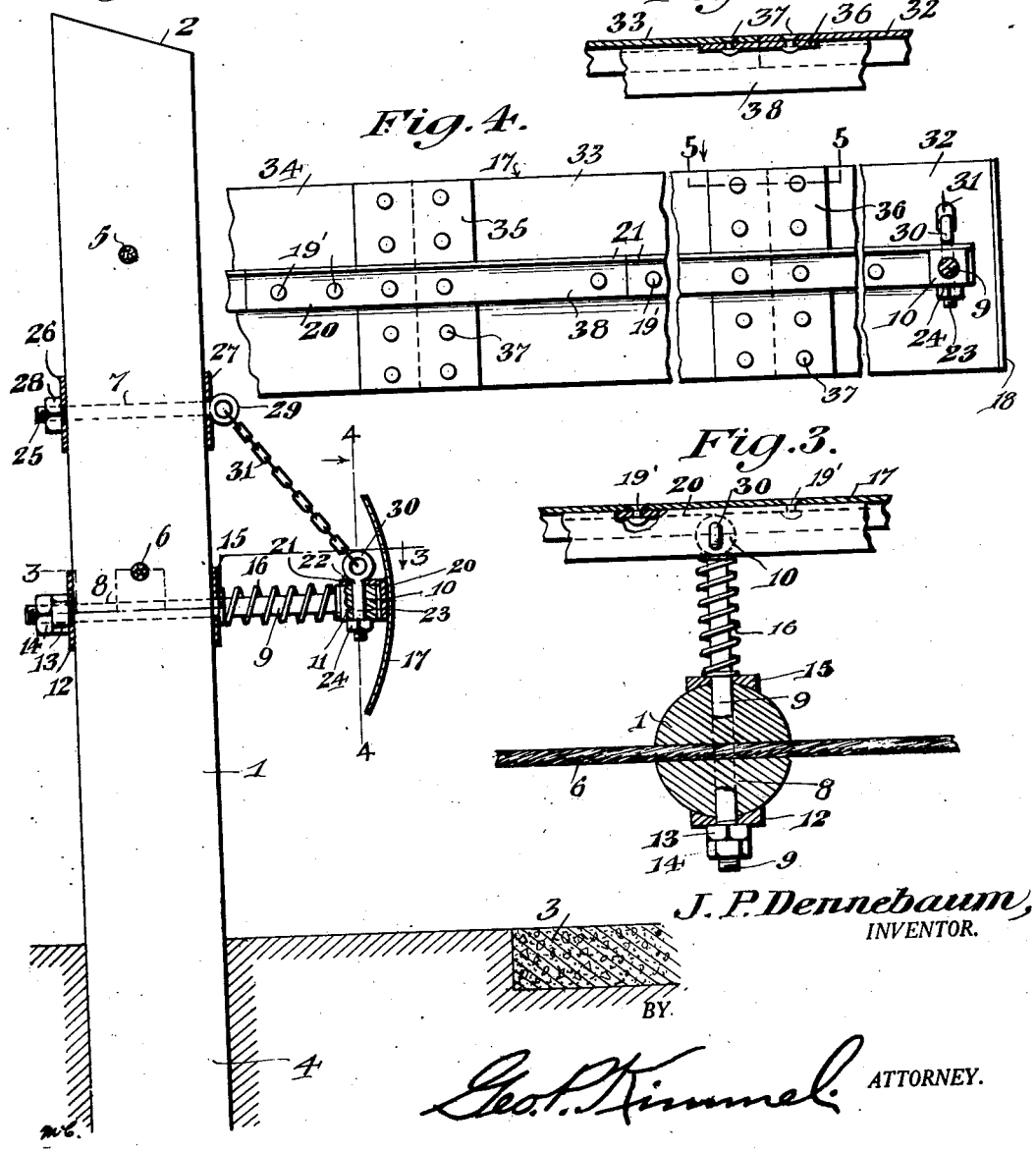
J. P. Dennebaum,
INVENTOR.
BY Geo. P. Kimmel, ATTORNEY.

Sept. 14, 1926.  J. P. DENNEBAUM  1,600,165
GUARD DEVICE
Filed April 22, 1925   2 Sheets-Sheet 2

INVENTOR.
J. P. Dennebaum,
BY
Geo. F. Kimmel, ATTORNEY.

Patented Sept. 14, 1926.

1,600,165

UNITED STATES PATENT OFFICE.

JOHN P. DENNEBAUM, OF SCRANTON, PENNSYLVANIA, ASSIGNOR TO STANDARD IRON WORKS, OF SCRANTON, PENNSYLVANIA.

GUARD DEVICE.

Application filed April 22, 1925. Serial No. 25,037.

This invention relates to a guard device for use for protective purposes at the sides of highways, and is designed primarily for use at the sides of a curve of a roadway; however, it is to be understood that a guard device, in accordance with this invention, can be employed at any point and for any purposes for which it is found applicable, and the invention has for its object to provide, in a manner as hereinafter set forth, a guard device for preventing a vehicle from leaving a roadbed sidewise thereof, thereby preventing accidents and further in setting up the guard device with means for absorbing shocks, as well as for reducing to a minimum damage or injury to a vehicle when the latter impacts the device.

Further objects of the invention are to provide, in a manner as hereinafter set forth, a guard device, which is simple in its construction and arrangement, strong, durable, thoroughly efficient in its use, conveniently installed, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of a roadway, showing the adaptation to a curve thereof, of a pair of guard devices, in accordance with this invention.

Figure 2 is a sectional elevation of a guard device, in accordance with this invention.

Figure 3 is a section on line 3—3, Figure 2.

Figure 4 is a section on line 4—4, Figure 2.

Figure 5 is a section on line 5—5, Figure 4.

Figure 6:
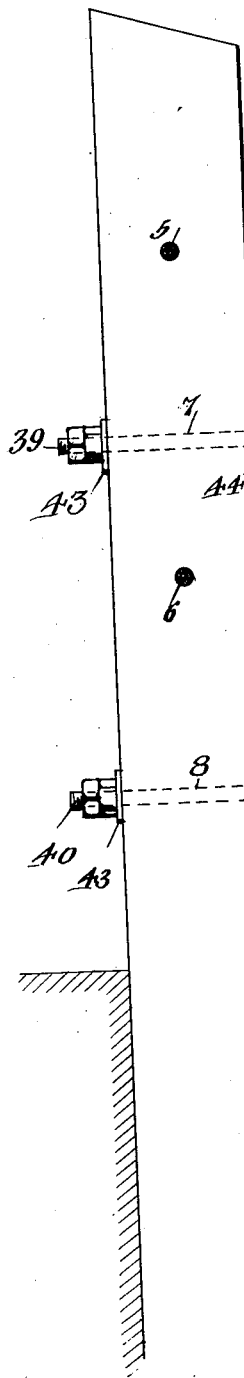
Figure 6 is a vertical sectional view of a modified form of guard device, in accordance with this invention.

A guard device, in accordance with this invention comprises supporting means for a plurality of carriers for a cushioned guard rail of arcuate contour in transverse section, and said supporting means can consist of a series of spaced wooden, concrete or iron standards, or a concrete wall of the desired length and contour; preferably the supporting means will be formed of a set of spaced standards of the desired number, and by way of example, with reference to Figure 1, each guard device is shown as including a supporting means formed of a set of six standards. The number of standards will depend upon the length of the guard rail to be presently referred to, and said rail is of a length to project from each outer standard of the set. The guard rail may consist of a single length of metallic material of the desired gage or formed of a plurality of sections secured together.

Each standard of the set is designated in the drawings throughout at 1, and the contour thereof may be square, polygonal or cylindrical; as shown by way of example, the standard is cylindrical in contour and is formed with a bevelled upper end 2. The standard 1 is of substantial length to extend above the roadbed 3 the desired distance, and further of a length as to be embedded a sufficient distance, as at 4, at one side of and spaced from the roadbed 3. The standards of the set are connected together by a plurality of steel cables 5, 6, spaced from each other.

Referring to Figure 2 of the drawings, the standard 1 is formed with a pair of diametrically extending superposed openings 7, 8, spaced a substantial distance from each other and with the opening 8 arranged a substantial distance above the roadbed 3. Extending through the opening 8 and projecting towards the roadbed 3 is a slidable bolt 9, having that end adjacent the roadbed 3 formed with a head 10 provided with a vertically disposed opening 11. The other end of the bolt 9, which projects from the standard 1, carries a washer 12, a securing nut 13 and a lock nut 14. The bolt 9 is spring controlled and the action of its controlling spring is to maintain the head 10 in close proximity to one side of the roadbed 3 and so that the washer 12 will abut against the standard 1, as shown in Figure 2. Mounted on the bolt 9 and engaging that side of the standard 1 opposite the side engaged by the washer 12 is a washer 15, and also mounted on the bolt 9 and interposed between the washer 15 and the head 10 is the controlling spring 16 for the bolt. The spring 16 not only tends to normally maintain the bolt 9 in the position shown in Figure 2, but also acts as a shock absorbing medium, and further to set up a cushioning action for the guard rail, to be presently referred to, whereby when the guard rail is impacted by the vehicle, injury or damage to the latter is reduced to a minimum.

The guard rail, which is indicated at 17, is arcuate in transverse section so that the top and bottom thereof will project away from one side of the roadbed 3. The guard rail 17 is of a length to project from each outer standard of the set and each end terminal portion thereof is curved outwardly, as indicated at 18, 19 Figure 1, so as to extend around the outer standards of the set and capable of being engaged by the oncoming motor vehicle. The curved end terminal portions 18 and 19 are horizontally disposed. Secured to that face of the guard rail 17, which opposes the standards, and at the longitudinal center of such face, by the counter-sunk rivets 19', is an angle iron 20 of a length equal to the distance from one outer standard of the set to the other outer standard of the set, and the said angle iron 20 includes a vertical and a horizontal leg, and with the vertical leg positioned against the heads 10, and the horizontal leg seating on the heads 10. The horizontal leg of the angle iron 20 is indicated at 21 and is formed with a series of openings 22, which register with the openings 11 in the heads 10. The angle iron 20, which may be termed an attaching member for the guard rail 17, is connected to the bolts 9 by eye-bolts 23 which extend down through the openings 22 and 11 and carry on their lower ends securing nuts 24, which abut against the heads 10.

Extending through the opening 7 in each of the standards 1, is an eye-bolt 25, carrying a pair of washers 26, 27, which abut against the standards 1, and further carrying a securing nut 28. The head of the eye-bolt 25 is indicated at 29 and is connected to the head 30 of an eye-bolt 23 by a flexible sustaining member 31.

When the guard rail 17 is set up with respect to the curve in a roadway, it is curved lengthwise so as to conform to the curvature of the bend or curve in the roadway, as indicated in Figure 1.

If the guard rail 17 is not formed of a single length of metallic material, but of a plurality of sections, then the attaching member 20 is also formed of a plurality of abutting sections. Figures 4 and 5 of the drawings illustrate the guard rail as formed of a plurality of sections 32, 33, and 34 connected together by pairs of transversely extending coupling plates 35, 36, arranged against the inner face thereof and secured in position by rows of countersunk rivets 37, and certain of said rivets act as means for securing the sections 38 of the attaching member to the guard rail.

With reference to Figure 6, extending through the opening 7 in the standard 1, is a bolt 39 and through the opening 8 a bolt 40. The heads of the bolts 39 and 40 are indicated at 41, 42 respectively and are arranged at the front of the standard 1. The bolt 39, as well as the bolt 40, carries a pair of washers 43, 44, arranged respectively against the back and front of the standard.

Extending from the bolt 39 to the bolt 40 is an arcuate spring 45 which projects towards the roadbed 3. Each end terminal portion of the spring 45 is bifurcated. One terminal portion of the spring 45 is indicated at 46, and the other at 47. The terminal portion 46 of the spring 45 straddles the bolt 39 and is interposed between one of the washers 44 and the head 41 of the bolt 39. The terminal portion 47 of the spring 45 straddles the bolt 40 and is interposed between the other washer 44 and the head 42 of the bolt 40. The bifurcated end terminal portions of the spring 45 set up a sliding connection between the latter and the bolts 39 and 40.

Figure 7:
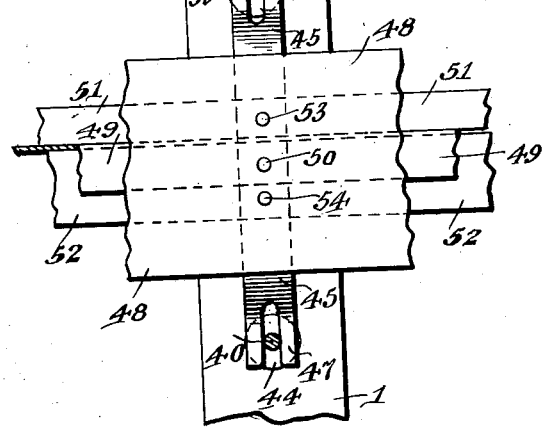
Figure 7 is a fragmentary view, in front elevation, of the form of the device shown in Figure 6.

In Figures 6 and 7, the guard rail is indicated at 48, and the attaching member therefor at 49. One of the rivets for securing the attaching member 49 to the guard rail 48 is indicated at 50.

Interposed between the guard rail 48 and the springs 45 carried by the standards of the set are an upper and a lower spacing bar 51, 52 respectively, formed of wood. The bar 52 is of greater width than the bar 51 and extending through the latter and the springs 45 and guard rail 48 are hold-fast devices 53, which are countersunk in the rail 48. Extending through the spacing bar 52 and the springs 45 and countersunk in the rail 48, are hold-fast devices 54. The spacing bar 52 is mortised, as at 55, for the reception of the vertical leg of the attachment member 49. The horizontal leg of the attaching member 49 is interposed between the packing bars 51 and 52. The guard rail 48 projects above the bar 51 and below the bar 52, and said bars are of the same length as the length of the attaching member 49 and act as means for spacing the rail 48 from the springs 45, and these latter not only constitute a shock absorbing medium but act as a cushioning means when the rail 48 is impacted by the vehicle. The guard rail shown in Figures 6, 7 and 8 is constructed substantially the same as the guard rail shown in Figures 2 and 4.

Figure 8:
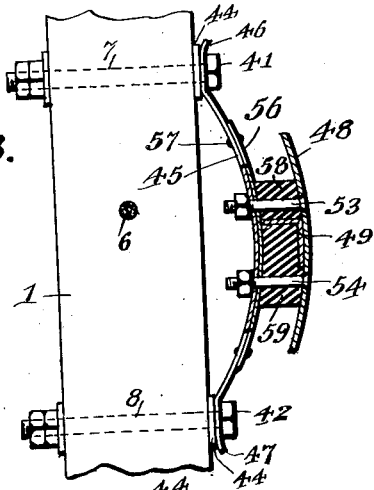
Figure 8 is a fragmentary view in vertical section, showing another modified form of guard device, in accordance with this invention.

In the modified form shown in Figure 8, the construction is the same as that shown in Figures 6 and 7, with the exception that there is attached to the outer face of the spring 45 a leaf spring 56, having its ends terminating at points removed from the ends of the spring 45. The spring 56 is connected to the spring 45 by the hold-fast devices 57. Interposed between the spring 56 and the guard rail 48 is a pair of spacing bars 58, 59 formed of rubber and constructed in the same manner as the bars 51, 52. Otherwise than that as stated, the form shown in Figure 8 is the same as that shown in Figure 6.

The bolts 9, in connection with their controlling springs constitute spring controlled carriers for the guard rails.

The bolts 39 and 40, in connection with the springs 45 or springs 45 and 56, constitute spring controlled carriers for the guard rail.

The bolts 25, in connection with the sustaining members 31 provide sustaining devices for the guard rail.

In the form shown in Figure 2, when the guard rail is impacted by the vehicle it causes a sliding movement of the bolts 9 against the action of the controlling spring 16, thereby setting up a cushioning action for said guard rail and with reference to Figures 6 and 8 the springs 45 and 56 set up a cushioning action for the guard rail when it is impacted upon by the vehicle.

It is thought that the many advantages of a guard device, for the purpose set forth and in accordance with this invention, can be readily understood, but although the preferred embodiments of the invention are as illustrated and described, yet it is to be understood that changes in the details of construction can be had which will fall within the scope of the invention as claimed.

What I claim is:—

1. A guard device for highways comprising a guard rail adapted to be disposed lengthwise of the highway at one side thereof, an attaching member in the form of an angle bar secured to the inner face of said rail at its longitudinal median and extending lengthwise thereof, a plurality of independent, spring controlled combined suspension and cushioning units connected at spaced points to said member for suspending the rail and to provide a cushioning action for the latter when impacted upon by a vehicle, said units, member and rail being shiftable in unison, and a plurality of spaced, fixed, vertically disposed supports, each of said supports carrying one of said units, each of said units connected with its respective support at spaced points, and said units normally maintaining said rail spaced forwardly of said supports.

2. A guard device for highways comprising a plurality of spaced standards, a slidable bolt extending through and connected to each of said standards and formed with an apertured head arranged exteriorly of its respective standard, a controlling spring mounted on each bolt and interposed between the head thereof and the outer face of its respective standard and normally maintaining the bolt projected with respect to the standard, a guard rail adapted to be disposed lengthwise of a highway at one side thereof, an inverted L-shaped bar extending lengthwise of the inner face of the guard rail and its top provided with spaced openings, said top mounted on the heads of said bolts, and hold-fast devices for connecting each head of a bolt to said attaching member.

3. A guard device for highways comprising a plurality of spaced standards, a slidable bolt extending through and connected to each of said standards and formed with an apertured head arranged exteriorly of its respective standard, a controlling spring mounted on each bolt and interposed between the head thereof and the outer face of its respective standard and normally maintaining the bolt projected with respect to the standard, a guard rail adapted to be disposed lengthwise of a highway at one side thereof, an attaching member extending lengthwise of the inner face of the guard rail and mounted on the heads of said bolts, hold-fast devices for connecting each head of a bolt to said attaching member, and superposed means extending through said standards for connecting them together.

4. A guard device for highways comprising a plurality of spaced standards, a slidable bolt extending through and connected to each of said standards and formed with an apertured head arranged exteriorly of its respective standard, a controlling spring mounted on each bolt and interposed between the head thereof and the outer face of its respective standard and normally maintaining the bolt projected with respect to the standard, a guard rail adapted to be disposed lengthwise of a highway at one side thereof, an attaching member extending lengthwise of the inner face of the guard rail and mounted on the heads of said bolts, hold-fast devices for connecting each head of a bolt to said attaching member, and a plurality of sustaining elements, each of said elements connected with a standard above the bolt carried thereby and further connected at its lower end to the upper end of a hold-fast device.

5. A guard device for highways comprising a plurality of spaced standards, a slidable bolt extending through and connected to each of said standards and formed with an apertured head arranged exteriorly of its respective standard, a controlling spring mounted on each bolt and interposed between the head thereof and the outer face of its respective standard and normally maintaining the bolt projected with respect to the standard, a guard rail adapted to be disposed lengthwise of a highway at one side thereof, an attaching member extending lengthwise of the inner face of the guard rail and mounted on the heads of said bolts, hold-fast devices for connecting each head of a bolt to said attaching member, superposed means extending through said standards for connecting them together, and a plurality of sustaining elements, each of said elements connected with a standard above the bolt carried thereby and further connected at its lower end to the upper end of a hold-fast device.

6. A guard device for highways comprising a plurality of spaced standards positioned at one side thereof, a headed bolt slidably mounted in and projecting outwardly from each of said standards and having a vertical opening exending through the head thereof, the heads of the bolts arranged outwardly with respect to the standards and normally spaced therefrom, a guard rail having apertured means mounted on the heads of said bolts, hold-fast devices extending through said means and the heads of the bolts for connecting these latter to said rail, and controlling springs interposed between the heads of the bolts and the outer face of said standards.

7. A guard device for highways comprising a plurality of spaced standards positioned at one side thereof, a headed bolt slidably mounted in and projecting outwardly from each of said standards, the heads of the bolts arranged outwardly with respect to the standards and normally spaced therefrom, a guard rail having means abutting against the heads of said bolts, hold-fast devices for securing said means to the heads of the bolts, controlling springs interposed between the heads of the bolts and the outer face of said standards, and a plurality of sustaining elements, each of said elements having its upper end connected with the standard above a bolt and its lower end attached to a hold-fast device.

8. A guard device for highways comprising a plurality of spaced standards, a slidable bolt extending through and connected to each of said standards and formed with an apertured head arranged exteriorly of and normally spaced from its respective standard, a controlling spring mounted on each bolt and interposed between the head thereof and the outer face of its respective standard and normally maintaining the bolt in projected position, a guard rail adapted to be disposed lengthwise of one side of a highway and normally positioned in spaced relation with respect to said standards, an apertured attaching member extending lengthwise of and secured to said rail and seated on the heads of the bolts and further having apertures thereof registering with the apertures in said heads, and hold-fast devices extending through said registering apertures for connecting said member to said heads.

9. A guard device for highways comprising a plurality of spaced standards, a slidable bolt extending through and connected to each of said standards and formed with an apertured head arranged exteriorly of and normally spaced from its respective standard, a controlling spring mounted on each bolt and interposed between the head thereof and the outer face of its respective standard and normally maintaining the bolt in projected position, a guard rail adapted to be disposed lengthwise of one side of a highway and normally positioned in spaced relation with respect to said standards, an apertured attaching member extending lengthwise of and secured to said rail and seated on the heads of the bolts and further having apertures thereof registering with the apertures in said heads, hold-fast devices extending through said registering apertures for connecting said member to said heads, each of said hold-fast devices provided with an eye at its upper end, and a plurality of sustaining elements, each of said elements connected at its upper end with a standard above a bolt and having its lower end attached to an eye of a hold-fast device.

10. A guard device for highways comprising a spring controlled guard rail adapted to be disposed lengthwise of the highway at one side thereof and formed of an intermediate and a pair of end portions, an inverted L-shaped bar having its vertical leg secured to and throughout the inner face of said intermediate portion at the longitudinal median thereof, and said intermediate portion in vertical section at any point thereof being concave-convex in contour.

In testimony whereof, I affix my signature hereto.

JOHN P. DENNEBAUM.